(12) United States Patent
Johnson et al.

(10) Patent No.: US 11,881,713 B1
(45) Date of Patent: Jan. 23, 2024

(54) DIGITAL TWIN ADVANCED DISTRIBUTION MANAGEMENT SYSTEMS (ADMS) AND METHODS

(71) Applicant: National Technology & Engineering Solutions of Sandia, LLC, Albuquerque, NM (US)

(72) Inventors: Jay Tillay Johnson, Albuquerque, NM (US); Rachid Darbali-Zamora, Mayaguez, OR (US); Adam Summers, Albuquerque, NM (US); Clifford W. Hansen, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 112 days.

(21) Appl. No.: 17/193,715

(22) Filed: Mar. 5, 2021

Related U.S. Application Data

(60) Provisional application No. 62/986,167, filed on Mar. 6, 2020.

(51) Int. Cl.
*H02J 3/38* (2006.01)
*G05B 13/04* (2006.01)
*H02J 3/00* (2006.01)

(52) U.S. Cl.
CPC ............ *H02J 3/381* (2013.01); *G05B 13/042* (2013.01); *H02J 3/003* (2020.01); *H02J 3/004* (2020.01); *H02J 2203/20* (2020.01); *H02J 2300/24* (2020.01)

(58) Field of Classification Search
CPC .. H02J 3/381; H02J 3/003; H02J 3/004; H02J 2203/20; H02J 2300/24; G05B 13/042
See application file for complete search history.

(56) References Cited

U.S. PATENT DOCUMENTS

| | | | |
|---|---|---|---|
| 2005/0193739 A1* | 9/2005 | Brunell | G05B 13/042 60/772 |
| 2011/0213739 A1* | 9/2011 | Benitez | G06Q 50/06 706/14 |
| 2016/0333854 A1* | 11/2016 | Lund | F03D 7/046 |
| 2020/0201314 A1* | 6/2020 | Franke | G01W 1/10 |
| 2021/0272394 A1* | 9/2021 | Cella | G05B 13/042 |

\* cited by examiner

*Primary Examiner* — Charles Cai
(74) *Attorney, Agent, or Firm* — Daniel J. Jenkins

(57) ABSTRACT

Advanced Distribution Management Systems not generally optimize over the entire feeder because there are few high-fidelity distribution circuit models and real-time distribution-connected sensors are rare. The limited observability at the distribution level makes it difficult to globally optimize distribution operations and issue control setpoints to power systems equipment or Distributed Energy Resources (DER) to perform grid-support services. For example, setpoints can be issued to DER based on results from an optimization module that incorporates a static or time-series feeder simulation. Feeder simulation initial conditions are populated with photovoltaic (PV) and load forecasts, state estimation results, and/or digital twin measurements or state output. The real-time (RT) digital twin runs a model of the feeder to generate state estimation pseudo-measurements since there are limited live feeder measurements.

17 Claims, 5 Drawing Sheets

DIGITAL TWIN ADVANCED DISTRIBUTION MANAGEMENT SYSTEMS (ADMS) AND METHODS

RELATED APPLICATIONS

This application claims priority to U.S. Provisional Patent Application Ser. No. 62/986,167, filed on Mar. 6, 2020, entitled "DIGITAL TWIN ADVANCED DISTRIBUTION MANAGEMENT SYSTEMS (ADMS) AND METHODS," the entirety of which is incorporated herein by reference in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to electrical power grid operation, and more particularly to active and reactive power controls for distributed energy systems.

BACKGROUND

With increasing interest in clean energy generation, interconnections with renewable energy installations continue to climb. This helps reduce the dependency on conventional fossil fuel, while at the same time reducing harmful carbon dioxide ($CO_2$) emissions. The drawback of incorporating these renewable energy sources is their dependency on variable natural resources (sunlight, wind, waves, etc.). These variabilities can have adverse effects on the power flow of the system—causing instabilities or voltage swings—affecting power system reliability. With recent advancements in grid-support capabilities and interoperability standardization, devices such as PV inverters can also be used to provide grid services, e.g., voltage regulation. These functions enable local control of the power system but there is a strong need to develop global optimization technologies.

SUMMARY OF THE DISCLOSURE

The present disclosure is directed to a controller for power system equipment and distributed energy resources in an electrical power system that includes a digital twin simulation module, a state estimation module and an optimization module. The digital twin simulation module receives one or more inputs from the electrical power system to update the digital twin simulation module while simulating the electrical power system. The state estimation module receives one or more inputs from the digital twin simulation module to calculate the operational states of the power system. The optimization module receives one or more inputs from the state estimation module representing the current operational conditions of the power system. The optimization module provides one or more control commands to one or more power system equipment or distributed energy resources in the electrical power system.

The present disclosure is further directed to a controller for power system equipment and/or distributed energy resources that includes a digital twin simulation module and an optimization module. The digital twin simulation module receives one or more inputs from the electrical power system to update the digital twin simulation module while simulating the electrical power system. The optimization module receives one or more inputs from the state estimation module representing the current operational conditions of the power system. The optimization module provides one or more control commands to one or more power system equipment or distributed energy resources in the electrical power system.

The present disclosure is further directed to a method for controlling one or more power system devices and/or distributed energy resources in an electrical power grid that includes simulating the electrical power grid in real-time in a digital twin simulation model, wherein the simulation model includes power system equipment and controller simulations, providing one or more inputs to the digital twin simulation model from one or more sensors in the electrical power grid, providing one or more inputs to a state estimator from the digital twin simulation model, the one or more inputs from the digital twin simulation model selected from the group consisting of active power, reactive power, voltage, current, frequency, power factor, or phasor data, and determining a state estimation solution at the state estimator that is provided to an optimization module that determines one or more control commands that are provided to the one or more power system equipment and controllers of the electrical power grid.

The present disclosure is further directed to a method for controlling one or more power system devices and/or distributed energy resources in an electrical power grid that includes simulating the electrical power grid in real-time in a digital twin simulation model, wherein the simulation model includes power system equipment and controller simulations, providing one or more inputs to the digital twin simulation model from one or more sensors in the electrical power grid, and providing one or more inputs from the digital twin simulation model to an optimization module that determines one or more control commands that are provided to the one or more power system equipment and controllers of the electrical power grid.

An advantage of the present disclosure is that one or more power system devices and/or distributed energy resources can be reactively controlled in an electrical power grid in real-time.

DETAILED DESCRIPTION OF THE DISCLOSURE

Figure 1:
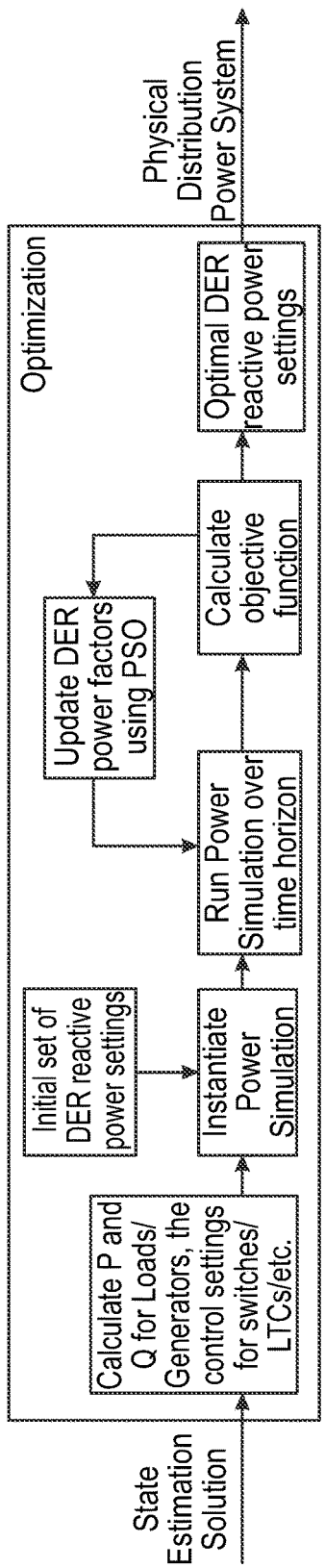
FIG. 1 illustrates data flows in the Optimization Method, that could use a range of techniques including local or global search methods including hill climbing, simulated annealing, genetic algorithm, particle swarm optimization, etc.

In order to effectively operate a power system, the presently disclosed systems and methods estimate the current operating state of the distribution power system using a digital twin of the distribution power system and determine control settings for actuators connected to and/or within the power system. The system states can be taken directly from the real-time digital twin or calculated using a real-time state estimator. The actuators are any grid-connect devices with communications capabilities that include, but are not limited to distributed energy resources (DER) or inverter-based resources (IBRs), energy storage systems (ESSs), electric vehicle (EV) chargers, capacitor banks, voltage regulators, switches, breakers, protection devices, loads, and demand response units. The determined control settings include, but are not limited to, active and reactive power settings for DER, IBRs, ESSs, EV chargers, protection or voltage regulation setpoints, or load set points. The control settings are optimized or otherwise selected to perform grid management or support operations such as voltage regulation, load following, energy balancing, peak shaving, providing ancillary reserves, or minimize losses. In prior systems and methods, distribution system state estimation does not generally exist because real-time distribution-connected sensors are rare. The limited observability at the distribution level makes it difficult to globally optimize distribution operations and issue control setpoints to DER to perform grid-support services. The disclosed novel systems and methods integrate a representative real-time power simulation that is run at the same time the power system is operating to reflect the operations of the physical power system. This real-time power simulation is called a digital twin.

According to an embodiment of the present disclosure, systems and methods are disclosed that configure power system devices to provide grid support services (voltage regulation, peak shaving, loss minimization, etc.) using a real-time digital twin. To do this, either (i) a digital twin directly populates the power simulation used in the optimization routine with power system active and reactive power states (see FIG. 3 and the supporting text below), or (ii) a digital twin supplies pseudo-measurements to a state estimator that populates the power system model in the optimization routine (see FIG. 2 and the supporting text below).

In the embodiment in (i) above, the power system active and reactive power states may be, but are not limited to phasor or synchrophasor data that includes voltages and phase angles of power system buses, active or reactive powers on the buses, power system equipment states, DER active and reactive power, or load levels. In the embodiment in (ii) above, additional live power system measurements, such as, but not limited to active power, reactive power, voltage, current, frequency, power factor, or phasor data from Phasor Measurement Units (PMUs), merging units, or other power system meters, which may be incorporated into the power system model. In the former case, power measurements can be input into the digital twin along with historical or estimated load, generation, or power system operations data. In both cases, this technology enables optimal power system operations. As used herein, the term "optimal power systems operations" is defined as a collection of device settings which minimize (or maximize) an objective or fitness function.

Figure 2:
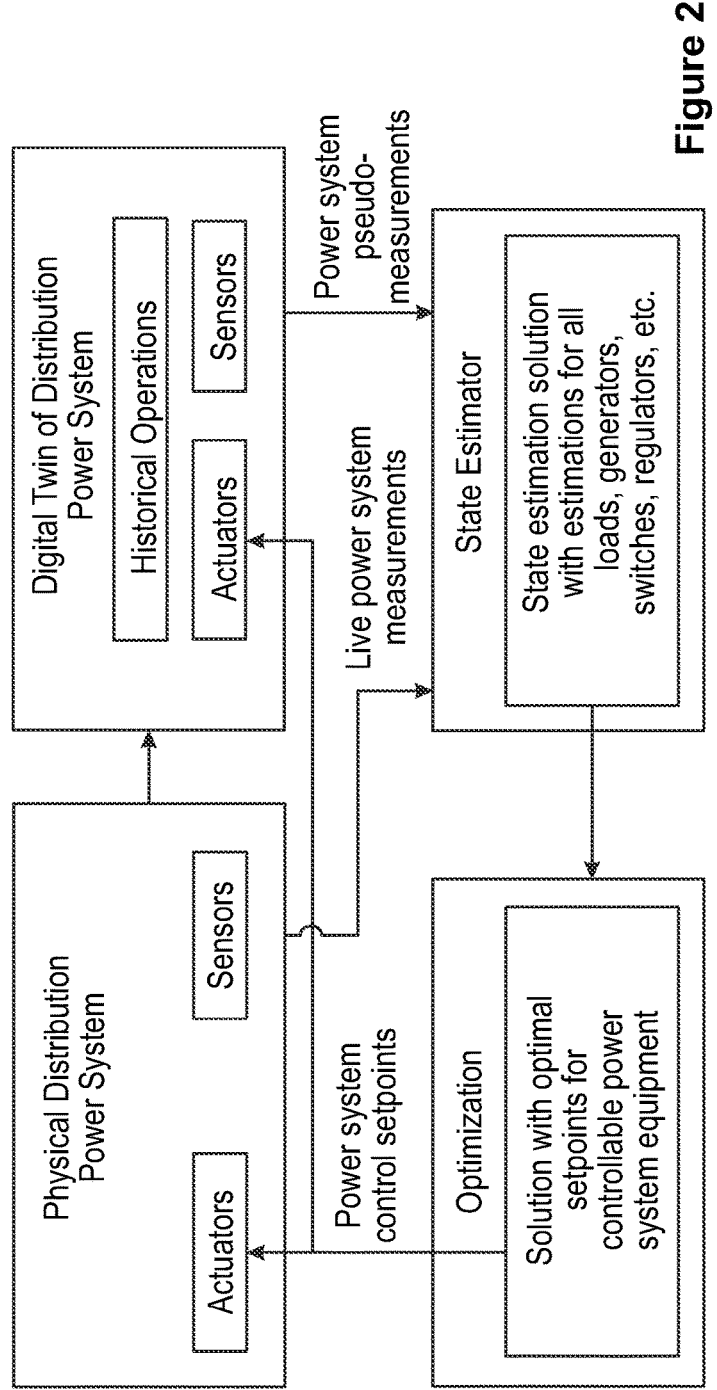
FIG. 2 shows the general information flows for the Digital Twin Advanced Distribution Management System (ADMS) when a state estimator is used according to an embodiment of the disclosure.

According to another embodiment of the disclosure, a controller for power system equipment and DER is disclosed that includes a digital twin simulation module, an optional state estimation module, and an optimization module (see controller scheme as embodied in FIG. 2). The digital twin simulation module receives input from an electrical power grid to update the simulation module while simulating the electrical power grid. The state estimation module receives input from digital twin simulation module. The input may be, but is not limited to active power, reactive power, voltage, frequency, power factor, or phasor data. The optimization module receives another input from state estimation module and, possibly, the physical power system or other sources, such as, but not limited to weather forecasts, DER production forecasts, customer or load data or forecasts, or power system meter data. That input may include, but is not limited to power system states, device settings, active power, reactive power, voltage, frequency, power factor, phasor data, and weather/load/generation forecasts. The optimization module provides a control command to one or more power system equipment devices and distributed energy resources. The control command may include, but is not limited to, control modes defined in IEEE 1547-2018 (e.g., active power setting, reactive power setting, constant power factor, voltage-reactive power mode, etc.), on/off commands, analog or digital control set points.

Figure 3:
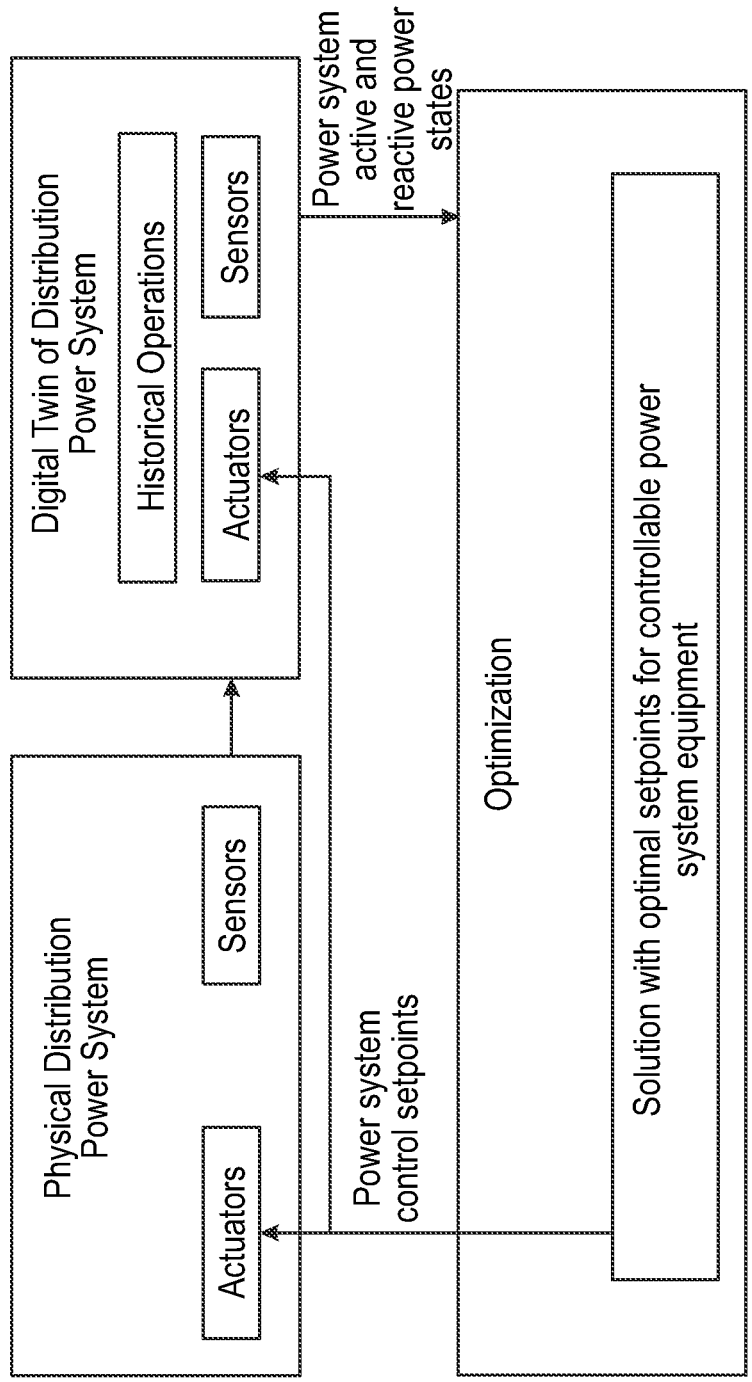
FIG. 3 shows another Digital Twin Advanced Distribution Management System (ADMS) implementation when a state estimator is not used.

According to another embodiment of the disclosure, a controller for power system equipment and distributed energy resources is disclosed that includes a digital twin simulation module and an optimization module (see controller scheme as embodied in FIG. 3). This embodiment of a controller includes the Digital Twin of Distribution Power System module and the Optimization module. The digital twin simulation module receives input from an electrical power grid to update the simulation module while simulating the electrical power grid. The optimization module receives another input from digital twin simulation module. The optimization module provides a control command to one or more power system equipment and/or distributed energy resources. The inputs and commands are as those discussed above.

The present disclosure is also directed to systems and methods for controlling one or more power system devices and/or distributed energy resources in an electrical power grid that includes simulating the electrical power grid, power system equipment and controllers in real-time (the digital twin), receiving inputs from electrical power grid, power system sensors, and/or measurements from distributed energy resource that are incorporated into the real-time simulation. The Optimization module issues commands to the power system devices and/or distributed energy resource to provide optimal power system operations or grid support services (voltage regulation, peak shaving, loss minimization, etc.).

A digital twin is a virtual representation of a physical system that can be used to simulate and analyze behavior. Digital twins approximate missing state variable information needed for control applications. This helps fill-in some gaps for frequently measured parameters due to lack of sensors and other measurement devices. Accurate predictions, rational decision making, and informed planning help improve performance.

The digital twin behaves in a manner that mirrors the physical system. An extended digital twin refers to a system than can go much further than mirroring the behavior of the physical system, since it becomes part of the decision-making process, employing forecasting, and prediction tool to improve outcomes. This is the type of system disclosed here and may be referred to hereafter as extended digital twin or digital twin. The digital twin fills in the information that cannot be collected from the physical power system with best estimates (or pseudo-measurements) of the expected operating state. One example of this, is to use a digital twin that consists of a feeder model with virtualized PMUs at each of the buses to send data to the state estimator. This fills in the gaps where measurements could not be taken in the field.

An optimization module determines power system control setpoints (controls) for the physical distribution power system. The optimization module considers inputs comprising the current state of the distribution power system as determined by sensors or from the digital twin simulation. The optimization module generates or obtains a forecast of power generation for each DER and generates or obtains a forecast for loads on the distribution system. The optimization module performs simulations of the distribution power system over the horizon spanned by the forecast, starting from the current state of the distribution power system, to project settings for switches and load tap changers (LTCs), and voltage on each bus. Optimal real and reactive power settings for each DER are determined by minimizing an objective function.

An optional state estimator is software that calculates the internal state of a system (e.g., a power system) given a set of measurements of the system. Power system state estimation is common in order to make control or planning decisions. In the embodiments presented in FIGS. 2 and 3, the state estimator is classified as a dynamic, distribution state estimator, meaning that it calculates the internal states of the power system in near real-time dynamically for a distribution power circuit. This information can then be feed to a power simulation within the optimization routine to improve the accuracy of the commanded actuator set points.

FIG. 1 shows an advanced distribution management system (ADMS) optimization configuration according to an embodiment of the disclosure. As can be seen in FIG. 1, a state estimation is used to update the load, generation, or power system state data in a static or time series power simulation, which can be referred to as an Optimization Module. In an embodiment, the Optimization Module may include an OpenDSS time series simulation, along with other historical or projected load, generation, and power system states, e.g., DER power forecasts (shown on FIG. 1 as the initial set of DER reactive power settings), to populate or update the power simulation conditions.

As can be seen in FIG. 1, the optimization module receives a state estimation solution and determines power system control setpoints for a physical distribution power system. The state estimation solution may include, but is not limited to actuator setpoints and voltages, currents, active and reactive powers, and frequencies for all phases on all buses and lines in the power system. The state estimation solution may be provided by a state estimator with input from a digital twin of distribution power system (see FIG. 2) or may be provided directly by a digital twin of distribution power system (see FIG. 3). As discussed above, the actuators are any grid-connect devices with communications capabilities that include, but are not limited to distributed energy resources (DER) or inverter-based resources (IBRs), energy storage systems (ESSs), electric vehicle (EV) chargers, capacitor banks, voltage regulators, protection devices, loads, and demand response units. The determined control settings include, but are not limited to, active and reactive power settings for DER, IBRs, ESSs, EV chargers, protection or voltage regulation setpoints, or load set points."

The optimization module takes the state estimation solution with additional input from a user for the initial set of DER reactive power settings, and performs the following steps:

a) generates or obtains a forecast of power generation for each DER b) generates or obtains a forecast of load on the distribution system; c) uses the outputs from a) and b) as input to an optimization that determine optimal DER reactive power settings by running power simulations over a time horizon that calculate real power P and reactive power Q for loads/generators, settings for switches and load tap changers (LTCs), and voltage on each bus, calculates objective functions, and updates DER power factors.

As an example, using a particle swarm optimization (PSO) approach, an optimization engine determines the necessary power factor (PF) settings for the DER to maintain voltage within ANSI C84.1 limits. The optimization evaluates circuit performance given by the state estimator outputs and DER power forecasts to minimize the risk of voltage while also maximizing economic value. In an embodiment, the optimization formulation may be designed to capture the voltage regulation components and economics considerations of operating PV systems off unity PF and is shown in:

$$\min_{\{PF\}} f(x) = [w_0 \delta_{violation}(V) + w_1 \sigma(V - V_{base}) + w_2 C(PF)]$$

where $\lambda_{violation}(V) = 1$ if any $|v| > V_{lim}$ $\sigma(V - V_{base})$ is the standard deviation of $V - V_{base}$ $C(PF) = \Sigma 1 - |PF|$ v is a vector of bus voltages, $v_{base}$ is a vector the nominal voltages for each bus, and PF is a vector of the DER PFs. The objective function, $f(x)$, is minimized over the set of PFs to attempt to set the bus voltages to $v_{base}$ and PF to unity with weighting coefficients $w_0$, $w_1$, and $w_2$. $V_{lim}$ was selected to be solutions outside ANSI C84.1 Range A limits, which would be highly penalized. The third term discouraged PF solutions away from unity power factor.

There are two types of inputs used to populate the optimization routine. The first is a historical prediction or forecast of load, generation, or power systems states. One example is photovoltaic forecasts that can be made using several different models and techniques—each with their own data requirements. In this embodiment, short-term forecasts were made using a persistence method that requires only the DER location, PV system AC and DC capacity and historical power. The ability to map forecasts to other DER devices was also established, so that if power data was not collected by some of the DER equipment, forecasts could still be created by scaling the production forecasts based on the capacities of each system. The forecasting component provides short-term (e.g., 5-minute) forecasts of PV power output and load using recent system states and statistical irradiance modeling in conjunction with PV performance models. The communications system monitors and controls multiple DER devices via internet channels. In other embodiments, other short-term forecasts may be made by other statistical, satellite-based, or commercial forecasting tools.

The second type of input into the optimization route is the current power system state. This represents the load, generation, or power system state from the distribution state estimation tool or the digital twin directly. Distribution system state estimation software generates the best estimate of the distribution power flows (bus and device current and voltage phasors) based on a set of field and digital twin measurements.

One of the major disadvantages of state estimation is the power system topology, locations of DER and other feeder end-devices, and the models of distribution circuit components and settings are required. This information can be provided by the utility but it is a lengthy process to construct a state estimator from that data. As an example, when using the Integrated Grounding Systems Analysis program for Windows (WinIGS), the utility data into State and Control Algebraic Quadratic Companion Form (SCAQCF). To do this for each feeder model, first a Compact Component Model consisting of set of algebraic and differential linear and nonlinear equations and inequalities was created. This model was then converted to a Quadratized Model with second order equations and inequalities and then into SCAQCF. Given the measurements and the device SCAQCF models in a feeder section, the DS-DSE created the measurement mathematical model at the device-level. Then, using network formulation techniques, the measurement mathematical models from device-level were converted to network level measurement models. The state estimation algorithm worked directly with the measurement mathematical model at the network level. This is shown in FIG. 2. In other embodiments, different state estimation algorithms and feeder construction methodologies could be used.

FIG. 2 illustrates a power systems controller (controller) according to an embodiment of the disclosure. As can be seen in FIG. 2, the controller includes a digital twin of the distribution power system module, a state estimator module and an optimization module. These modules and their respective functionality and operation are as described above. The physical distribution power system is the system that carries electricity from the transmission system to individual consumers. Typically, these systems operate at voltages between 0.6 and 35.0 kV and are configured in a radial network from substations connected to the transmission system. They can contain a wide range of distributed generation sources and/or loads. Many generator(s) and load(s) are actuators that can adjust their active and reactive power levels, and other operational characteristics. Within the physical distribution power system, sensors are used to measure and monitor performance of the power system and estimate power system operations and future needs. These devices include advanced metering infrastructure (AMI), DER/ESS/IBR/EV chargers and other distributed equipment PMUs, merging units, or other power system meters.

As can further be seen in FIG. 2, controller's digital twin of the distribution power system mirrors or replicates the physical distribution power system and provides power system pseudo-measurements to the state estimator module. The state estimator module, using the power system pseudo-measurements and inputs from the physical distribution power system determines a state estimation solution with estimates for the active and reactive powers for all the loads on the distribution system buses. The inputs from the physical distribution power system may include, but are not limited to sensor measurements, forecasts, consumer load data, or other data.

The optimization module performs as described above to determine power system control setpoints (controls) for the physical distribution power system.

FIG. 3 shows an alternative to the control method described in FIG. 2, where the load, generator, or power system states are exported from a digital twin itself to populate the initial conditions and other parameters for the distribution simulation within the optimization routine as shown in FIG. 3. The digital twin could either be updated with field measurements or not.

Figure 4:
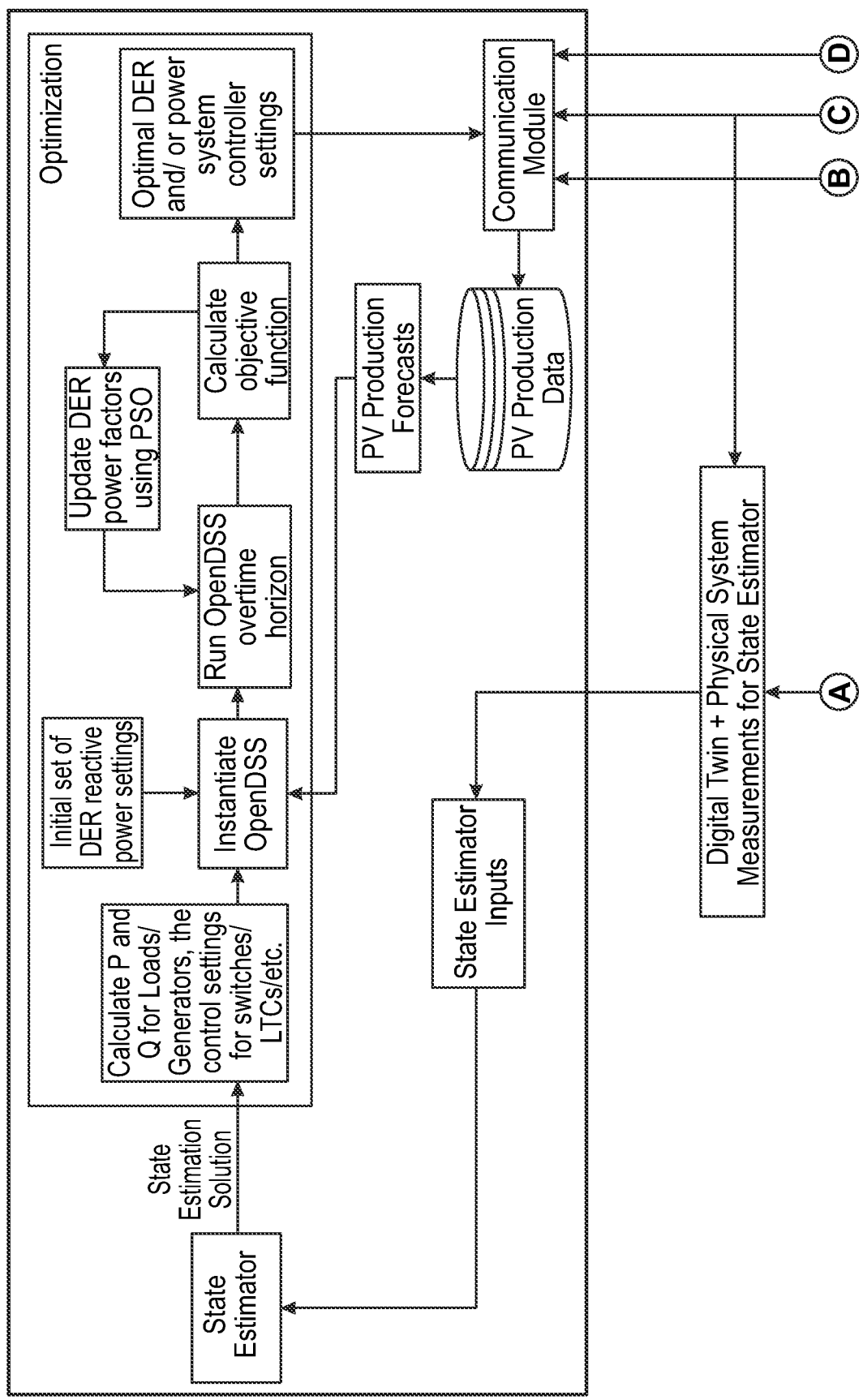
FIG. 4 shows a diagram of the Digital Twin Concept for the National Grid distribution feeder according to an embodiment of the disclosure. The physical equipment is controlled in the same manner as simulated devices are in the digital twin. Measurements from the physical power system and the digital twin are used to generate an estimation of the power system status in order to run the optimization over the next time horizon (e.g., 1 min).
Figure 4:
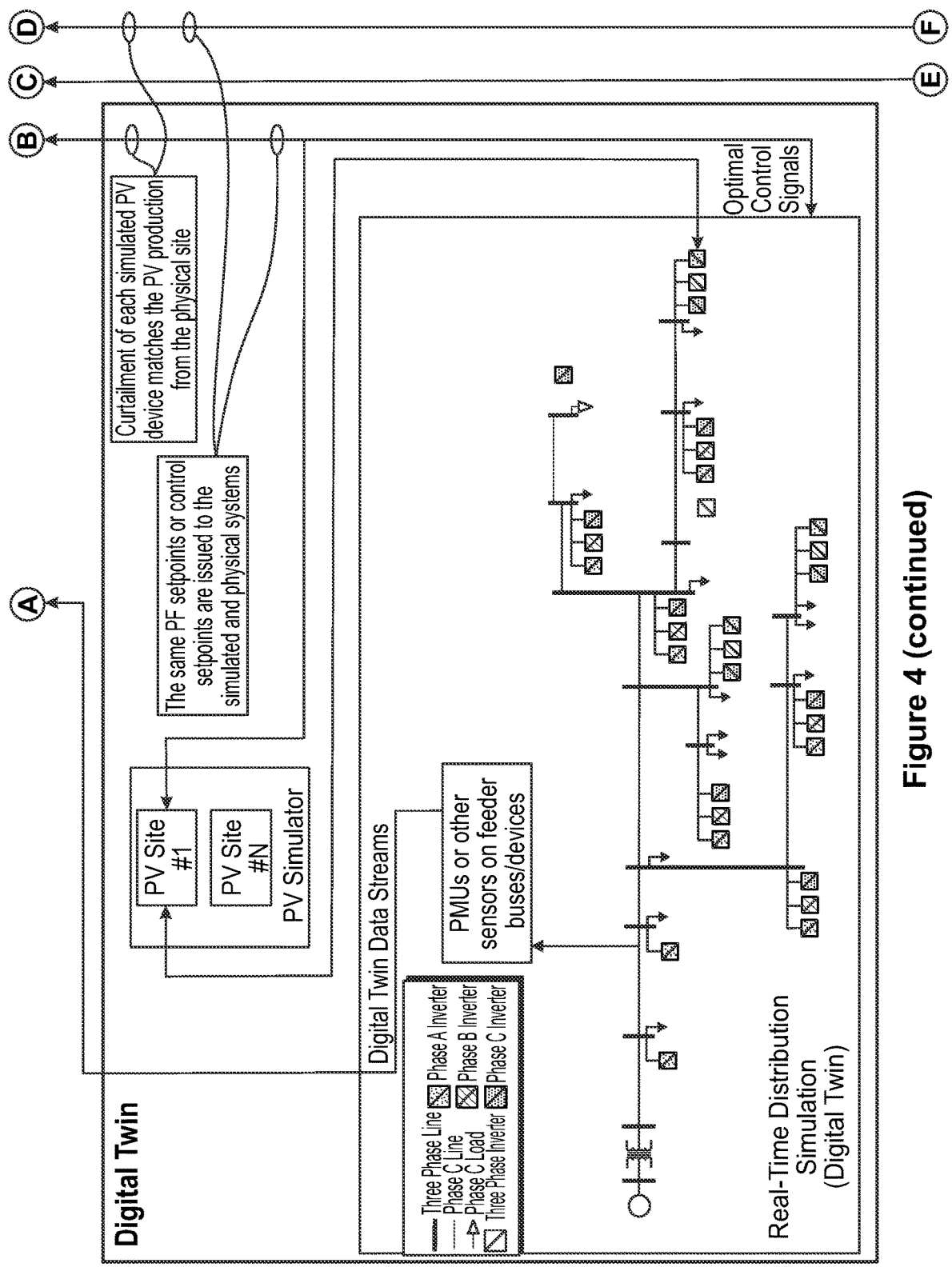
Figure 4:
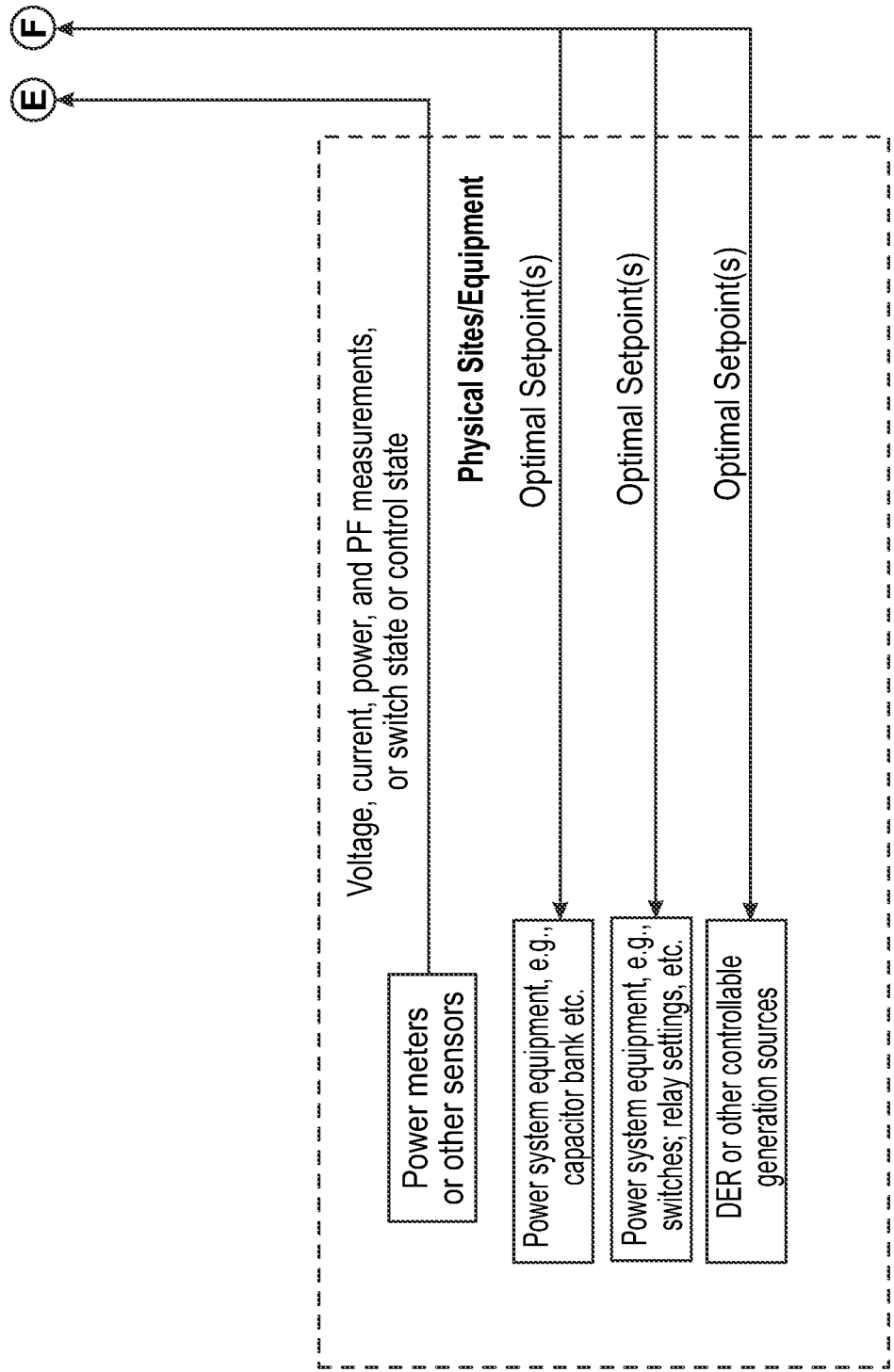

FIG. 4 illustrates the implementation of the digital twin concept to optimize the operations of the distribution system. As can be seen in FIG. 4, physical power system equipment is controlled and read (bottom portion) through a communication module. Control equipment settings are issued by the optimization routine in the top box and issued through this communication module. Optionally, the communication module is used to measured PV, load, or other power system activity to predict the future operation of power devices using a forecasting tool. The digital twin of the power system is represented in the middle of the figure with simulated PV systems providing power equipment. Other power system equipment (either simulated or connected as hardware-in-the-loop equipment) could also be used as inputs into the digital twin. The digital twin runs using a real-time simulator such as an Opal-RT, Typhoon HIL, RTDS, or some other device that executes a power simulation in real time. Measurements from the digital twin, along with physical power system measurements are sent to the state estimator to find the most likely power system state. This state estimation is used as input to another power simulations that is used in the optimization routine to find the optimal power system setpoints to the power system equipment, DER, and/or demand response loads. Again, it is also possible to use measurements directly from the digital twin to update the optimization power system simulation—optionally with input coming from the physical power system into the digital twin, as shown in FIG. 3.

The controllable power system equipment may include a range of devices. It could include DER devices, e.g., PV systems, energy storage systems, electric vehicles, or controllable loads, capacitor banks, on-load tap changing transformers, or other voltage regulation equipment, switches, or any other controllable equipment. The power system-connected devices receive commands from the optimizer to change states, control parameters, or active or reactive power generation or load or schedules.

Simulation Results

Power system simulations were conducted on a rural distribution feeder to evaluate the impact of the ADMS on the distribution voltage. The reactive power contributions from each DER were adjusted to provide voltage regulation. Highly variable irradiance profiles were used to adjust the simulated PV inverter output. Variable load profiles were used on loads connected to multiple buses to create transient voltage variability as well. The simulation showed the ADMS approach, described herein, reduced the average bus voltage deviation from nominal.

To better understand the differences in these approaches, an analytical score was developed to summarize the effectiveness of each voltage regulation method:

$$\text{score} = \frac{1}{T}\int_{t=t_0}^{t_{end}} \frac{1}{N}\sum_{b=1}^{N}(|v_{bl}(t) - v_{nom}| - |v_{reg}(t) - v_{nom}|)dt$$

where $v_{bl}$ is the baseline voltage without any voltage regulation, $v_{nom}$ is the nominal voltage, and $v_{reg}$ is the voltage from the voltage regulation method, T is the time period of the simulation, b is the bus, and t is the simulation time. The scores representing the average voltage improvement for all buses averaged over a four-hour simulation period in units of per unit (pu). Using these equations, the digital twin ADMS approach demonstrated an improvement of 73.7%.

Field Demonstration Experimental Results

The grid support functions were implemented on a live distribution power system which contained three utility-scale PV sites. Inverters at a National Grid-owned site were controlled for the field demonstrations. In this demonstration, average bus voltage, power factor, and active and reactive power were measured on the physical power system at a single location and provided to the digital twin. DER power factor setpoints were the optimization output, which were sent to the physical power system devices and the emulated DER in the digital twin, as shown in FIG. 4.

A day with little to no irradiance variability was selected to demonstrates the voltage profile under normal conditions. The voltage, active and reactive powers at the DER site were measured at the PCC for a period of several hours were measured and showed the digital twin ADMS matched the physical power system well. Overall, the digital twin ADMS operated the PV system near unity and close to the optimal settings from the optimization, as expected, and the field demonstration was considered a success.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A controller for power system equipment and distributed energy resources in an electrical power system, comprising:
    a digital twin simulation module;
    a state estimation module; and
    an optimization module;
    wherein the digital twin simulation module receives one or more inputs from one or more sensors in the electrical power system to update the digital twin simulation module while simulating the electrical power system, and
    wherein the state estimation module receives one or more real-time pseudo-measurements, selected from the group consisting of an active power, a reactive power, a voltage, a current, a frequency, a power factor, and phasor data, from the digital twin simulation module to calculate operational states of the electrical power system; and
    wherein the optimization module receives one or more inputs from the state estimation module representing current operational conditions of the electrical power system; and
    wherein the optimization module provides one or more control commands to one or more of the power system equipment or one or more of the distributed energy resources in the electrical power system, the one or more control commands comprising control setpoints, the control setpoints simulated in the digital twin simulation module in real-time with the one or more commands provided to the one or more of the power system equipment or the one or more of the distributed energy resources; and
    wherein the digital twin simulation model comprises power system equipment and simulations.

2. The controller of claim 1, wherein the digital twin simulation module comprises a database of historical operations of the electrical power system.

3. The controller of claim 1, wherein the digital twin simulation module comprises model simulations of actuators and sensors of the electrical power system.

4. The controller of claim 1, wherein the one or more inputs from the electrical power system to the digital twin simulation module comprise one or more sensor measurements from one or more corresponding sensors in the electrical power system.

5. The controller of claim 1, wherein the one or more control commands are selected from the group consisting of demand response signals, Institute of Electrical and Electronics Engineers (IEEE) 1547-2018, an active power setting, a reactive power setting, a constant power factor, a voltage-reactive power mode, on/off commands, and other analog or digital control set points.

6. The controller of claim 1, wherein the one or more inputs to the digital twin simulation module and the one or more control commands are provided in real-time.

7. A controller for power system equipment and/or distributed energy resources in an electrical power system, comprising:
    a digital twin simulation module; and
    an optimization module;
    wherein the digital twin simulation module receives one or more inputs from one or more sensors in the electrical power system to update the digital twin simulation module while simulating the electrical power system, and
    wherein a state estimation module receives one or more real-time pseudo-measurements, selected from the group consisting of an active power, a reactive power, a voltage, a current, a frequency, a power factor, and phasor data, from the digital twin simulation module to calculate operational conditions of the electrical power system; and
    wherein the optimization module receives one or more inputs from the state estimation module representing current operational conditions of the electrical power system, and
    wherein the optimization module provides one or more control commands to one or more of the power system equipment or one or more of the distributed energy resources in the electrical power system, the one or more control commands comprising control setpoints that are provided to the one or more of the power system equipment or the one or more of the distributed energy resources in real-time, the control setpoints simulated in the digital twin simulation module; and wherein the digital twin simulation model comprises power system equipment and further comprises controller simulations that run in real-time with the provision of the one or more control commands.

8. The controller of claim 7, wherein the digital twin simulation module comprises a database of historical operations of the electrical power system.

9. The controller of claim 7, wherein the digital twin simulation module comprises model simulations of actuators and sensors of the electrical power system.

10. The controller of claim 7, wherein the one or more inputs from the electrical power system to the digital twin simulation module comprise one or more sensor measurements from one or more corresponding sensors in the electrical power system.

11. The controller of claim 7, wherein the one or more control commands are selected from the group consisting of demand response signals, IEEE 1547-2018, an active power setting, a reactive power setting, a constant power factor, a voltage-reactive power mode, on/off commands, and analog or digital control set points.

12. A method for controlling one or more power system devices and/or distributed energy resources in an electrical power grid, comprising:
    simulating the electrical power grid in real-time in a digital twin simulation module, wherein the digital twin simulation module comprises power system equipment and further comprises controller simulations;
    providing one or more inputs to the digital twin simulation module from one or more sensors in the electrical power grid;
    providing one or more real-time pseudo-measurements to a state estimator from the digital twin simulation module, the one or more real-time pseudo-measurements from the digital twin simulation module selected from the group consisting of an active power, a reactive power, a voltage, a current, a frequency, a power factor, and phasor data; and
    determining a state estimation solution at the state estimator that is provided to an optimization module that determines one or more control commands that are provided to one or more power system equipment and controllers of the electrical power grid, the one or more control commands comprising control setpoints provided in real-time with the digital twin simulation module simulation, the control setpoints simulated in the digital twin simulation module.

13. The method of claim 12, wherein the one or more commands provide optimal power system operations or grid support services for the electrical power grid.

14. The method of claim 12, wherein the one or more commands regulate one or more parameters of the electrical grid selected from the group consisting of a voltage, a peak shaving and a loss minimization.

15. A method for controlling one or more power system devices and/or distributed energy resources in an electrical power grid, comprising:
    simulating the electrical power grid in real-time in a digital twin simulation module, wherein the digital twin simulation module comprises power system equipment and controller simulations;
    providing one or more inputs to the digital twin simulation module from one or more sensors in the electrical power grid;
    providing one or more real-time pseudo-measurements to a state estimator from the digital twin simulation module, the one or more pseudo-measurements being used to generate a state estimation solution by the state estimator and selected from the group consisting of an active power, a reactive power, a voltage, a current, a frequency, a power factor, and phasor data; and
    providing the state estimation solution from the state estimator to an optimization module that determines one or more control commands that are provided to one or more power system equipment and controllers of the electrical power grid in real-time with the running of the digital twin simulation module, the one or more control commands comprising control setpoints, the control setpoints simulated in the digital twin simulation module.

16. The method of claim 15, wherein the one or more commands provide optimal power system operations or grid support services for the electrical power grid.

17. The method of claim 15, wherein the one or more commands regulate one or more parameters of the electrical grid selected from the group consisting of a voltage, a peak shaving and a loss minimization.

* * * * *